United States Patent [19]

Shannon

[11] Patent Number: 5,072,853

[45] Date of Patent: Dec. 17, 1991

[54] APPARATUS AND TECHNIQUE FOR SETTING BRIX IN A SOFT DRINK DISPENSER

[75] Inventor: Joseph W. Shannon, Kent, Ohio

[73] Assignee: ABCC/TechCorp, Akron, Ohio

[21] Appl. No.: 558,527

[22] Filed: Jul. 27, 1990

[51] Int. Cl.$^5$ .............................................. G01F 11/00
[52] U.S. Cl. .......................................... 222/1; 222/55; 222/61; 222/129.1; 222/640; 73/861.05
[58] Field of Search ....................... 222/55, 57, 61, 63, 222/71, 129.1, 129.2, 129.3, 129.4, 640, 641, 1; 73/861.05

[56] References Cited

U.S. PATENT DOCUMENTS

| | | | |
|---|---|---|---|
| 3,081,910 | 3/1963 | Zedler, Jr. | 222/71 X |
| 4,104,914 | 8/1978 | McClure | 73/861.05 |
| 4,186,601 | 2/1980 | Marouka | 73/861.05 |
| 4,487,333 | 12/1984 | Pounder et al. | 222/71 X |
| 4,728,005 | 3/1988 | Jacobs et al. | 222/129.1 X |

FOREIGN PATENT DOCUMENTS 2083615  3/1982  United Kingdom ................. 222/55
2101089  1/1983  United Kingdom ................ 222/641

Primary Examiner—Michael S. Huppert
Assistant Examiner—Joseph A. Kaufman
Attorney, Agent, or Firm—Renner, Kenner, Greive, Bobak, Taylor & Weber

[57] ABSTRACT

A soft drink dispenser is provided with a first electrical probe within the syrup dispensing line, and a second electrical probe a fixed distance below the dispensing head. Upon actuation of the syrup dispensing valve, the two probes determine the amount of time required for syrup to pass the distance from the dispensing head to the second probe. This time is a function of flow rate of the syrup and, accordingly, of the brix of the resulting drink. This flow rate can then be adjusted by adjusting the time period that syrup is dispensed, or the pressure head under which the dispensing is achieved, or a restriction within the dispensing line. Such adjustment brings the brix of the soft drink to the desired level.

19 Claims, 1 Drawing Sheet

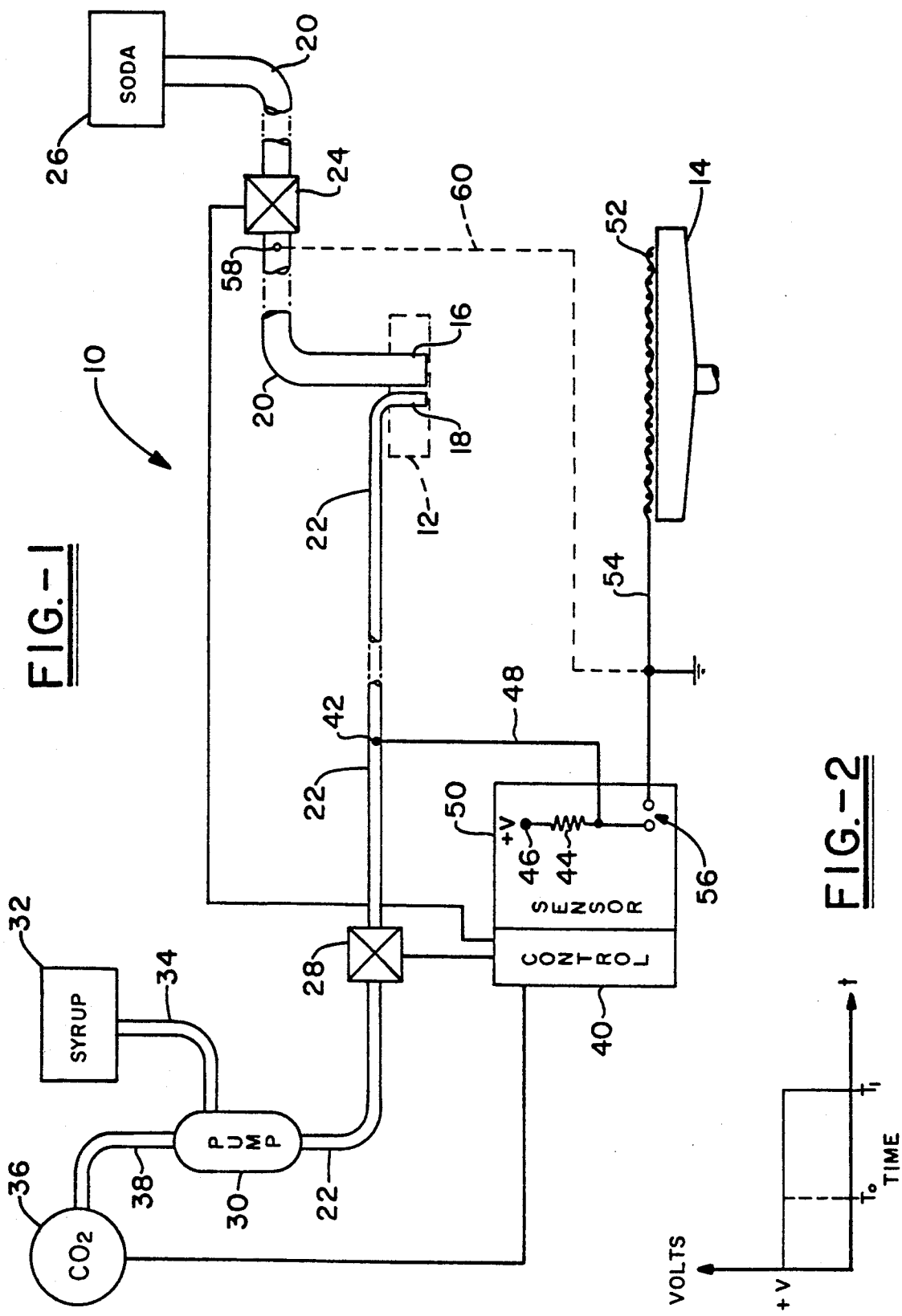

5,072,853

APPARATUS AND TECHNIQUE FOR SETTING BRIX IN A SOFT DRINK DISPENSER

TECHNICAL FIELD

The invention herein resides in the art of beverage dispensing apparatus and techniques. More specifically, the invention relates to such apparatus and techniques as the same pertain to soft drink dispensing. Specifically, the invention relates to an apparatus and technique for adjusting or setting the "brix" or syrup/soda ratio in a soft drink dispenser.

BACKGROUND ART

It is well known that soft drinks consist of a combination of flavoring/sweetening syrup and soda or carbonated water. The sweetness or "brix" of the resulting soft drink is a function of the ratio of syrup to soda. It has been found that this ratio is critical to obtain and maintain a desired quality and taste of soft drinks dispensed from a dispenser. Accordingly, this invention presents an apparatus and technique for setting the brix of a soft drink dispenser.

Previously, it has been know to measure the amount of syrup dispensed during a dispensing cycle in a soft drink dispenser. The quantity so obtained is then compared to the required quantity for the desired brix and requisite adjustments of the dispensing time cycle and/or pressure head employed for dispensing the syrup are the made. A subsequent measurement is then made to determine whether the desired brix has been achieved. If not, the adjustment is made again and the process repeated until the desired brix is achieved.

Present day dispensing systems employ microprocessor or other sophisticated control units to regulate the dispensing cycle. In such modern systems, the amount of syrup dispensed during a dispensing cycle is received by a measurement cylinder. Based upon that measurement, a number of dual inline paddings (DIP) switches or the like are set to increase or decrease the pressure head acting upon the syrup during the dispensing cycle. Similar DIP switches could also be adjusted to regulate the duration of the syrup dispensing cycle, similarly increasing or decreasing the amount of syrup dispensed thereby. In either event, a dispensing cycle is again entered into, with the syrup being received by the measurement cylinder. The DIP switches are again adjusted and the process repeated until the desired quantity of syrup is dispensed during the dispensing cycle.

It will be readily appreciated by those skilled in the art that the prior apparatus and techniques for setting the brix in a beverage dispenser are given to human error. Indeed, such systems and techniques employ a trial and error approach to the desired adjustment. Further, employment of the technique is time consuming and has inherent inaccuracies resulting from the limitations of adjustments in fixed increments accommodated by the DIP switches or other adjustment mechanisms. Yet further, the prior art techniques and apparatus are given to tampering after the adjustment has been made.

DISCLOSURE OF INVENTION

In light of the foregoing, it is an aspect of the invention to provide an apparatus and technique for setting the brix of a soft drink dispenser which is automated, eliminating human error, while providing almost instantaneous brix adjustment.

Yet a further aspect of the invention is the provision of an apparatus and technique for setting the brix of a soft drink dispenser which is based on sensing of flow rates rather than physical measurements of dispensed volumes.

Another aspect of the invention is the provision of an apparatus and technique for setting the brix of a soft drink which is accurate and reliable in use and implementation, substantially eliminating human error and trial and error approaches.

Another aspect of the invention is to provide an apparatus and technique for setting the brix of a soft drink dispenser which is substantially tamper proof.

The foregoing and other aspects of the invention which will become apparent as the detailed description proceeds are achieved by apparatus for setting the brix of a soft drink dispenser, comprising: a source of syrup; a dispensing head receiving and dispensing syrup from said source of syrup; a valve interposed between said source of syrup and said dispensing head, said valve enabling and inhibiting said dispensing of syrup; and sensing means operatively connected to said dispensing head for sensing and determining an actual rate of flow of said syrup from said dispensing head.

Further aspects of the invention are attained by apparatus for setting the brix of soft drinks dispensed by a soft drink dispenser, comprising: a dispensing head; a source of syrup in communication with said dispensing head through a conduit; a first electrical probe within said conduit; and a second electrical probe operatively positioned a set distance beneath said dispensing head; a voltage source providing a voltage differential between said first and second probes; and a valve within said conduit, actuation of said valve emitting a stream of syrup from said dispensing head and providing an electrical interconnection between said first and second electrical probes.

Yet further aspects of the invention are attained by a method of setting the characteristic brix of soft drinks dispensed from a soft drink dispenser, comprising: establishing a source of syrup; initiating at a time $T_0$ dispensing of said syrup from a dispensing head; sensing said syrup upon reaching a point a fixed distance beneath said dispensing head at a time $T_1$; determining the time period $T_1-T_0$; and adjusting a syrup dispensing cycle of the soft drink dispenser as a function of said time period.

DESCRIPTION OF DRAWING

For a complete understanding of the objects, techniques and structure of the invention reference should be made to the following detailed description and accompanying drawing wherein:

FIG. 1 is a schematic block diagram of a soft drink dispensing system according to the invention; and FIG. 2 is an illustration of the adjustment control signal attained by the system of FIG. 1.

BEST MODE FOR CARRYING OUT THE INVENTION

Referring now to the drawing and more particularly FIG. 1, it can be seen that a soft drink dispensing system according to the invention is designated generally by the numeral 10. As will be appreciated by those skilled in the art, the system 10 includes a dispensing head 12 for emitting syrup and soda into a cup or other receptacle received upon a support plate and drain assembly 14 positioned therebelow. The dispensing head 12 includes a soda dispensing nozzle 16 and a syrup dispensing nozzle 18, preferably maintained separate and apart from each other, but not necessarily so for practicing the invention herein. A soda line or conduit 20 extends from the soda nozzle 16, as does a syrup line or conduit 22 from the syrup dispensing nozzle 18. Positioned within the soda line 20 is a soda dispensing valve 24, actuated in a manner to be discussed hereinafter. As will be appreciated by those skilled in the art, the valve 24 would typically be a solenoid valve as commonly used in the beverage dispensing industry.

A soda generator 26 is maintained at the end of the line 20 opposite the nozzle 16, the generator 26 providing a constant source of soda under pressure to the line 20. As will be understood by those skilled in the art, the soda generator and supply source 26 typically comprises a source of water and a source of carbon dioxide ($CO_2$) gas, such gas being entrained into the water under a pressure head, thereby carbonating the water and creating soda. While not important for an understanding of the instant invention, it will be appreciated that the pressure source for generating the soda may also be the pressure source for urging the soda through the line or conduit 20.

A syrup dispensing valve 28 is interposed within the syrup line or conduit 22. The valve 28 is preferably a solenoid actuated valve. Connected to the end of the syrup line 22 opposite the nozzle 18 is a syrup pump 30 communicating with an appropriate source of syrup 32 through a conduit 34. The supply 32 may be any bulk supply of syrup adapted for replenishing the pump 30 in any of the various manners well known to those skilled in the art. Also communicating with the pump 30 is a $CO_2$ pressure source 36, communicating through a conduit 38 to provide a pressure head in the pump 30. It will be readily appreciated that the pressure source 36 will typically include a pressure regulator or other suitable control means for regulating the pressure head generated thereby. In any event, the pressure head provided by the source 36 and introduced into the pump 30 provides the requisite pressure head for urging syrup therefrom, through the syrup line 22 and out of the dispensing nozzle 18 upon actuation of the solenoid valve 28.

Those skilled in the art will appreciate that any suitable source for the dispensing of syrup could be employed with the concept of the invention. While a source operating under a gaseous pressure head is shown, various other sources are contemplated such as a gravity system, mechanical system, or the present bagin-box system.

It will be readily appreciated that a control unit 40 is included as part and parcel of the system 10 for controlling actuation of the dispensing valves 24, 28 and regulating the characteristic pressure of the $CO_2$ source 36. Of course, the control unit 40 will also control various other functions of the soft drink dispensing system 10, not critical for appreciation of the invention herein. As is readily understood by those skilled in the art, the control unit 40 will typically comprise an appropriate microprocessor or digital control chip, the same now being state of the art in this industry.

A pour switch or other actuation means will typically be associated with the dispensing head 12. Upon actuation by placement of the cup beneath the head 12, or other manual actuation, the control unit 40 causes the valves 24, 28 to open for a period of time defining the dispensing cycle. Typically, the valves 24, 28 will open for simultaneous periods of time, but such is not necessarily required. In any event, the period of time that the valves 24, 28 are opened during the dispensing cycle is preferably sufficient to assure that a full measure of soft drink is dispensed, and that the appropriate ratio of syrup to soda is obtained to assure the proper brix of the drink. For that reason, it is important that, upon installation of the system 10, the brix be set. It will be appreciated that the brix, simply being the ratio of syrup to soda in the drink, can be modified by either adjusting the flow rate of the syrup dispensed, or the period of time the syrup is dispensed with respect to the soda, or by adjusting a restriction or constriction interposed within the dispensing line. While the invention herein contemplates any type of adjustment, it is preferred that the pressure head on the syrup dispensing pump 30 be regulated through the regulator of the $CO_2$ supply 36 to achieve the desired adjustment.

To set the brix of the dispensing system 10, an electrical probe 42 is introduced into the dispensing line 22, making contact with the syrup passing therethrough. A resistor 44 connects to a voltage source 46, introducing such voltage source to the probe 42 through the resistor 44 and electrical conductor 48. Accordingly, the syrup within the conduit 22 is maintained at a voltage potential V.

An electrically conductive screen 52 is positioned beneath the dispensing head 12, and is connected by means of a conductor 54 to a second voltage potential, preferably ground. As shown, the conductors 48, 54 provide sensing terminals at a sensor 50, such terminals providing a means for determining when syrup from the syrup dispensing nozzle 18 has reached the conductive screen 52. As shown, the voltage source 46 and resistor 44 also comprise a portion of the sensor 50. In any event, it will be readily appreciated by those skilled in the art that the potential difference across the sensing terminals 56 will typically be the voltage V. However, when the solenoid valve 28 is opened such that syrup from the dispensing nozzle 18 is emitted onto the conductive screen 52, a circuit is completed from the voltage source 46 through the resistor 44 to ground. This voltage drop is a result of current flow through the resistor 44, such current flow being facilitated by completion of the circuit by grounding of the syrup stream upon reaching the screen 52. By knowing the distance between the syrup dispensing nozzle 18 and the screen 52, and by determining the time required for the syrup to flow from the nozzle 18 to the screen 52, the flow rate of syrup from the dispensing head 12 can be determined.

As shown, the control unit 40 is operatively connected to the sensor 50 and is operative to control the valves 24, 28, as well as the pressure regulator of the $CO_2$ source 36. Referring now to FIGS. 1 and 2 in unison, it can be seen that the voltage across the terminals 56 is typically at the supply voltage level V. At time $T_0$ the control unit 40 actuates the syrup dispensing valve 28, allowing syrup to pass the fixed distance between the dispensing head 12 and the screen 52. At time $T_1$, sensed by the sensor 50, the voltage differential across the sensing terminals 56 goes to zero or ground, a result of the syrup contacting the conductive screen 52. Accordingly, the time $T_1 - T_0$ is that time required for the syrup, acting as an electrical conductor, to pass the fixed distance between the dispensing head 12 and the screen 52. With the inside cross sectional area of the conduit 22 being known, the flow rate of the syrup can therefore be determined. The total volume dispensed in any time is, accordingly, simply a multiple of that flow rate times the dispensing time. A calculation can readily be made by the control unit 40 to determine whether the flow rate is as desired, or if an adjustment needs to be made. In a preferred embodiment of the invention, the pressure regulator of the $CO_2$ supply 36 will be adjusted to achieve the desired flow rate for the desired brix. It will, of course, be appreciated that the time period that the valve 28 is actuated during a dispensing cycle could also be adjusted to achieve the desired brix, or adjustment may be made to a restriction placed within the dispensing line. Such techniques achieve regulation of the amount of syrup dispensed during the dispensing cycle, hence controlling the brix of the beverage.

It will be readily appreciated by those skilled in the art that the actual flow rate of the syrup need not be determined. Since the distance between the dispensing head 12 and the screen 52 upon the support plate and drain assembly 14 is fixed, and since the inner cross sectional area of the dispensing tube 22 is similarly fixed, the flow rate of the syrup is simply a function of the time period $T_1-T_0$. Indeed, the flow rate is inversely proportional to this time period. Appropriate adjustments of pressure can be made as a function of the time period $T_1-T_0$, without actually calculating the flow rate.

It will also be appreciated by those skilled in the art that, at the beginning of the dispensing cycle, the syrup is at the very end of the syrup nozzle 18 such that the measurement of the time period $T_1-T_0$ is very accurate. The presence of the syrup at the end of the dispensing nozzle 18 at the beginning and end of each dispensing cycle is readily understood by those skilled in the art. It is obtained by what is referred to as the implementation of a "hydraulic accumulator" attained by the elastic nature of the conduit 22, causing the conduit 22 to expand under the dispensing pressure and then contract upon closure of the valve 28, assuring that syrup is withdrawn and held at the end of the dispensing nozzle 18 by means of a vacuum created within the conduit 22 adjacent the valve 28 upon closure of the valve, and by the surface tension of the syrup at the end of the dispensing nozzle.

Other means may be provided for completing the circuit of the sensor 50. For example, the conductive screen 52 may be replaced by a probe 58 inserted in the soda line 20 which is grounded by the conductor 60, shown in phantom. With the stream of syrup from the nozzle 18 being separated from the stream of soda from the nozzle 16, the sensor circuit 50 will be completed when the two streams meet or otherwise electrically engage upon contacting the support plate and drain 14. With the plate and drain 14 being a known distance below the dispensing head 12, and with the soda valve 24 being actuated sufficiently prior to the actuation of the syrup valve 28 to assure that the soda will reach the plate and drain 14 prior to the syrup, the rate of flow of the syrup can be readily determined as presented above.

Thus it can be seen that an apparatus and technique has been provided for setting the brix in a soft drink dispenser. Measurement of syrup flow rate is obtained, and appropriate adjustments of the dispensing head pressure on the syrup, or the dispensing time cycle of the syrup, or dispensing line constrictions are made. With adjustment achieved, the characteristic brix of the dispensing system is set upon installation. This brixing technique is achieved automatically, by means of control unit 40, with the only physical structure necessarily added to the system being the introduction of the conductive screen 52 and associated electrical conductor 54 connected to the sensor 50, and particularly one of the sensing terminals 56.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. Apparatus for setting the brix of a soft drink dispenser, comprising:
   a source of syrup;
   a dispensing head receiving and dispensing syrup from said source of syrup;
   a valve interposed between said source of syrup and said dispensing head, said valve enabling and inhibiting said dispensing of syrup;
   sensing means operatively connected to said dispensing head for sensing and determining an actual rate of flow of said syrup from said dispensing head wherein a first portion of said sensing means is positioned beneath said dispensing head by a known distance, said syrup dispensed from said dispensing head contacting said first portion; and
   control means operatively interconnected between said sensing means and said source of syrup for adjusting said actual flow rate to attain a desired flow rate.

2. The apparatus according to claim 1, further comprising a pump interposed between said source of syrup and said dispensing head, said pump having a pressure head for dispensing syrup therefrom.

3. The apparatus according to claim 2, wherein said control means adjusts said pressure head as a function of a difference between said actual flow rate and said desired flow rate.

4. The apparatus according to claim 2, wherein said sensing means comprises a second portion for introducing a voltage potential into said syrup.

5. The apparatus according to claim 4, wherein said first portion of said sensing means comprises an electrical conductor positioned beneath said dispensing head by a known distance, said syrup dispensed from said dispensing head contacting said conductor and completing an electrical circuit between said voltage potential and said electrical conductor.

6. The apparatus according to claim 5, wherein said sensing means determines a period of time between actuation of said valve to enable said dispensing of syrup and contact of said electrical conductor by said syrup.

7. The apparatus according to claim 6, wherein said control means adjusts said pressure head as a function of said period of time.

8. Apparatus for setting the brix of soft drinks dispensed by a soft drink dispenser, comprising:
   a dispensing head;
   a source of syrup in communication with said dispensing head through a conduit;
   a first electrical probe within said conduit;
   a second electrical probe operatively positioned a set distance beneath said dispensing head;

a voltage source providing a voltage differential between said first and second probe; and a valve within said conduit, actuation of said valve emitting a stream of syrup from said dispensing head and providing an electrical interconnection between said first and second electrical probes.

9. The apparatus according to claim 8, wherein said actuation of said valve initiates a signal and said electrical interconnection of said first and second electrical probes by said stream of syrup terminates said signal, a time duration of said signal being indicative of a flow rate of syrup within said conduit.

10. The apparatus according to claim 9, wherein said source of syrup is under pressure and further comprising control means operatively connected to said source of syrup under pressure for adjusting said pressure as a function of said time duration of said signal.

11. The apparatus according to claim 9, further comprising control means operatively connected to said valve for controlling a period of duration for actuation of said valve during a dispensing cycle, said control means setting said period of duration of actuation as a function of said time duration of said signal.

12. The apparatus according to claim 9, further comprising a resistor interposed between said voltage source and said first electrical probe.

13. The apparatus according to claim 12, wherein said second electrical probe comprises an electrically conductive screen.

14. A method for setting the characteristic brix of soft drinks dispensed from a soft drink dispenser, comprising:

establishing a source of syrup;

initiating at time $T_0$ dispensing of said syrup from a dispensing head;

sensing said syrup upon reaching a point a fixed distance beneath said dispensing head at a time $T_1$;

determining the time period $T_1-T_0$; and adjusting a syrup dispensing cycle of the soft drink dispenser as a function of said time period.

15. The method according to claim 14, wherein said step of adjusting said syrup dispensing cycle comprises the step of adjusting a pressure head on said source of syrup as a function of said time period $T_1-T_0$.

16. The method according to claim 14, wherein said step of adjusting said syrup dispensing cycle comprises a step of adjusting a time duration for said syrup dispensing cycle as a function of said time period $T_1-T_0$.

17. The method according to claim 14, wherein said initiation of said dispensing of said syrup is attained by actuation of a dispensing valve at time $T_0$.

18. The method according to claim 17, wherein a voltage potential is introduced into said syrup and said point beneath said dispensing head is at a ground reference.

19. The method according to claim 17, wherein said syrup falls to said ground reference upon reaching said point beneath said dispensing head, said change from said voltage potential to said ground reference establishing time $T_1$.

* * * * *